(12) United States Patent
De Vries

(10) Patent No.: US 8,682,302 B2
(45) Date of Patent: Mar. 25, 2014

(54) PLACE-SPECIFIC BUDDY LIST SERVICES

(75) Inventor: Jean Pierre De Vries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/619,808

(22) Filed: Sep. 14, 2012

(65) Prior Publication Data

US 2013/0095859 A1 Apr. 18, 2013

Related U.S. Application Data

(63) Continuation of application No. 12/710,125, filed on Feb. 22, 2010, now Pat. No. 8,275,361, which is a continuation of application No. 11/140,645, filed on May 27, 2005, now Pat. No. 7,668,537, which is a continuation of application No. 09/626,170, filed on Jul. 27, 2000, now Pat. No. 6,968,179.

(51) Int. Cl.
*H04M 3/42* (2006.01)
*H04W 24/00* (2009.01)

(52) U.S. Cl.
USPC ............ 455/414.1; 455/456.3; 455/566

(58) Field of Classification Search
USPC .......... 455/414.1, 422.1, 456.1, 456.2, 456.4, 455/456.6, 457, 466, 518, 566; 340/993
See application file for complete search history.

(56) References Cited

U.S. PATENT DOCUMENTS

| | | | |
|---|---|---|---|
| 5,086,394 A | 2/1992 | Shapira | |
| 5,548,726 A | 8/1996 | Pettus | |
| 5,689,809 A | 11/1997 | Grube | |
| 5,812,950 A | 9/1998 | Tom | |
| 5,926,765 A | 7/1999 | Sasaki | |
| 5,946,626 A | 8/1999 | Foladare et al. | |
| 6,377,793 B1 | 4/2002 | Jenkins | |
| 6,456,854 B1 * | 9/2002 | Chern et al. | 455/457 |
| 6,519,463 B2 | 2/2003 | Tendler | |
| 6,549,768 B1 | 4/2003 | Fraccaroli | |
| 6,553,236 B1 * | 4/2003 | Dunko et al. | 455/456.1 |
| 6,587,691 B1 | 7/2003 | Granstam et al. | |

(Continued)

FOREIGN PATENT DOCUMENTS

| | | |
|---|---|---|
| EP | 0 804 010 | 10/1997 |
| EP | 0 817 444 | 1/1998 |

(Continued)

OTHER PUBLICATIONS

C. Partridge, "Mail Routing and the Domain System"; IETF, RFC 974, Jan. 1986, 5 pp.

(Continued)

*Primary Examiner* — Quochien B Vuong
(74) *Attorney, Agent, or Firm* — Ben Tabor; David Andrews; Micky Minhas

(57) ABSTRACT

An information service provides search and notifications to inform when certain people (e.g., friends, family, business contacts, etc.) are nearby so as to facilitate communications with those people. Users may define lists of people whose locations may be tracked by positioning equipment based on personal communications/computing devices carried by the people. The information service processes this people and place data to identify those of the listed people that are in the user's vicinity, and provide notifications and user-initiated search results informing the user such as via the user's personal communications/computing device.

20 Claims, 9 Drawing Sheets

(56) References Cited

U.S. PATENT DOCUMENTS

| | | | |
|---|---|---|---|
| 6,879,838 B2* | 4/2005 | Rankin et al. | 455/456.6 |
| 6,957,076 B2* | 10/2005 | Hunzinger | 455/456.3 |
| 6,968,179 B1 | 11/2005 | De Vries | |
| 7,668,537 B2 | 2/2010 | De Vries | |
| 8,275,361 B2 | 9/2012 | De Vries | |
| 2010/0151842 A1 | 6/2010 | De Vries | |
| 2010/0227594 A1 | 9/2010 | De Vries | |

FOREIGN PATENT DOCUMENTS

| | | |
|---|---|---|
| WO | WO 97/20441 | 6/1997 |
| WO | WO 00/22860 | 4/2000 |
| WO | WO 00/78002 | 12/2000 |

OTHER PUBLICATIONS

E. Horvitz, A. Jacobs, D. Hovel, "Attention-Sensitive Alerting"; Proceedings of UAI '00; Conference on Uncertainty and Artificial Intelligence, Jul. 1999, pgs. 10 pp.

"The HAVi Specification: Specification of the Home Audio/Video Interoperability (HAVi) Architecture"; HAVi Specification, Nov. 19, 1998, 409 pp.

Zhang et al., "X.500 Directory and OSI Management"; Including A Communications Theory Mini Conference; Dec. 6-9, 1992, 6 pp.

Office Action mailed May 7, 2003, in U.S. Appl. No. 09/626,170, 11 pp.

Response to Office Action filed Nov. 10, 2003 in U.S. Appl. No. 09/626,170, 11 pp.

Office Action mailed Feb. 12, 2004, in U.S. Appl. No. 09/626,170, 12 pp.

Response to Office Action filed Jul. 15, 2004 in U.S. Appl. No. 09/626,170, 13 pp.

Office Action mailed Jan. 26, 2005, in U.S. Appl. No. 09/626,170, 13 pp.

Response to Office Action filed Feb. 28, 2005 in U.S. Appl. No. 09/626,170, 10 pp.

Notice of Allowance mailed Apr. 26, 2005 in U.S. Appl. No. 09/626,170, 7 pp.

Office Action mailed Jun. 27, 2008 in U.S. Appl. No. 11/140,645, 10 pp.

Response to Office Action filed Nov. 28, 2008 in U.S. Appl. No. 11/140,645, 13 pp.

Office Action mailed Mar. 19, 2009 in U.S. Appl. No. 11/140,645, 13 pp.

Response to Office Action filed Jul. 16, 2009 in U.S. Appl. No. 11/140,645, 14 pp.

Notice of Allowance mailed Oct. 7, 2009 in U.S. Appl. No. 11/140,645, 4 pp.

Office Action mailed Feb. 6, 2012 in U.S. Appl. No. 12/710,125, 11 pp.

Response to Office Action filed May 7, 2012 in U.S. Appl. No. 12/710,125, 3 pp.

Office Action mailed Jun. 25, 2012 in U.S. Appl. No. 12/783,669, 23 pp.

Response to Office Action filed Sep. 25, 2012 in U.S. Appl. No. 12/783,669, 3 pp.

Office Action mailed Nov. 20, 2012 in U.S. Appl. No. 12/783,669, 10 pp.

Notice of Allowance mailed May 16, 2012 in U.S. Appl. No. 12/710,125, 8 pp.

U.S. Appl. No. 12/710,125, Amendment and Response filed Aug. 16, 2012 (3 pgs).

U.S. Appl. No. 12/783,669, Notice of Allowance mailed Mar. 5, 2013 (8 pages).

U.S. Appl. No. 12/783,669, Amendment and Response filed Feb. 19, 2013 (3 pages).

* cited by examiner

.DEVICES
.SERVICES
.NETWORKS
.VENUES
.SPACES
.PEOPLE
.PROCESSES
.EVENTS

PLACE-SPECIFIC BUDDY LIST SERVICES

CROSS-REFERENCE TO RELATED APPLICATIONS

This application is a continuation of, and claims priority to, U.S. patent application Ser. No. 12/710,125, filed Feb. 22, 2010, now U.S. Pat. No. 8,275,361, which is a continuation of U.S. patent application Ser. No. 11/140,645, filed May 27, 2005, now U.S. Pat. No. 7,668,537, which is a continuation of U.S. patent application Ser. No. 09/626,170, filed Jul. 27, 2000, now U.S. Pat. No. 6,968,179, each of which is hereby incorporated by reference in its entirety.

TECHNICAL FIELD

This invention relates to communications and messaging systems and services, and more particularly to such systems and services to facilitate communication based on location and inter-relationships of people.

BACKGROUND AND SUMMARY

Wireless telecommunications in the form of pagers, cell phones and their supporting communications networks have led to changes in the ways that people meet, socialize and communicate. The market penetration of cell phones in parts of Europe has resulted in cell phone ownership being a norm, rather than an exception. This circumstance has lead to changes in the ways that people, particularly the young, arrange to meet for social interaction. It is now common, for example, that a person will initially contact a friend or friends via cell phone, and after inquiring of each other's present location, mutually decide on an intermediate meeting place (such as a coffee shop, restaurant, mall or park) for further in-person social interaction. By contrast, prior means of communication did not support such ad-hoc, spontaneous meeting and gathering. In-person meetings previously might depend upon chance encounters of friends in public places, prior arrangement (e.g., via voice mail, message on a bulletin board, etc.), exhaustive searching (e.g., visiting or telephone calling several locations where the friend(s) are routinely found), etc.

Yet, current mobile telecommunications technologies still do not adequately facilitate people's social interaction. The just-described initiating of in-person meetings via cell phone is limited in that the friend or friends called may be geographically distant (e.g., in a remote part of the community, or even "out-of-town") or otherwise occupied, while other friends not called may be immediately available and "just-around-the-corner." This lack of information results in many missed opportunities for in-person social interaction. Further, this one-to-one cell phone calling requires an exponentially increasing number of interactions as the group size increases.

Other known telecommunications technologies also fail to focus on or solve this problem of facilitating opportunities for in-person meeting. For example, several companies now provide instant messaging services on the Internet (e.g., the MSN Messenger of Microsoft Corporation, ICQ, the AOL Instant Messenger of America Online, Inc., Yahoo Messenger, etc.). These instant messaging services facilitate communications via private Internet "chat" (i.e., exchange of instantaneous person-to-person text messages over the Internet). The users first construct lists of other users who have mutually agreed to participate in instant messaging with each other. The users also are required to download and install a client software program on their computers used for Internet access. Upon the computer logging on to the Internet, this client software program notifies an instant messaging server operated by the providing company that the respective user is on the Internet. A user can also set an availability indicator, e.g., to indicate she is "on the phone." The users are then notified by the instant messaging server which users on their lists are "on-line" and available for instant messaging "chat." More generally, users are alerted to the on-line state of their friends, e.g. which are "online", "busy" or "on the phone." Although useful for promoting communications between remotely located users of the Internet, these instant messaging services also fail to facilitate opportunities for in-person meeting.

Also available is a match-making device, called the "Lovegety." This key-chain suspended, egg-shaped device comes in male (blue) and female (pink) versions, and can be set to any of three modes indicating its user's desire for "talk," "karaoke," or "get2" (i.e., romance). When opposite gender models come within transmission range (i.e., about 15 feet), the devices emit an audible alarm. Also, if the two models are set to the same mode (such as, both on "talk" mode), the devices flash green. Again, the Lovegety fails to adequately facilitate opportunities to socialize in-person with friends and others known to you.

The present invention is directed towards providing user-contextual information services based on place and people via mobile telecommunications devices, such as to facilitate in-person social interaction with those that the user has established relationships. In an embodiment of the invention described herein, a place-specific buddy list service is an information service provided to users on a data communications network, which may be a wireless telecommunications network accessed by users from mobile personal information devices such as cell phone, pager, personal digital assistant (PDA), notebook computer, handheld computer, or other mobile personal embedded networked computing and/or telecommunications device—although other access devices and communications mediums also can be used. The information service processes information as to the people with whom the user has established relationships and the location of those people as reported by their mobile personal devices, so as to then provide place-specific people notifications to the user as well as user-initiated search results. The notifications and search results may take the form of an audible alarm, voice, textual display, or graphical display, among others.

In one alternative of the invention, the information service tracks a people/place state for each user, which contains a set of people (e.g., other users) and information of their locations (which also may include other "presence" information, such as availability and visibility). Preferably the set of people has the form of a buddy list, which is a list of other users that are known to the user and have mutually consented to be added to each other's buddy lists. The information service also tracks a location state for each user, such as by having each user's mobile device report that user's location to the information service. As any user moves location, the information service updates that user's location state, and also updates any people/place states whose set of users includes the moved user. When any user's people/place state changes, the information service generates a state change event which may trigger notifications to the user.

In another alternative, the user can set rules and/or parameters to control when notifications are generated based on a change event to the user's people/place state. For example, a user may set a proximity parameter designating that notifications are provided only when the other users on his or her buddy list are within a certain proximity (e.g., within a same building complex, within a certain number of miles or kilometers, etc.). As further examples, the user may set rules or parameters to enable or disable notifications, such as to prevent interruption when the user is in a meeting, involved in a task, etc.

In still another alternative, the user can set rules and/or parameters to control when information of the user's location is allowed to change other users' people/place states or result in notifications to such other users. For example, a user can set a "visibility" parameter to either a "visible" value which enables information of the user's location to change other users' people/place states, or an "invisible" value in which the user's location is not revealed in notifications to other users.

In yet another alternative, the user can segregate the other users tracked in his or her people/place state into separate subsets, such as subsets of family, friends, business contacts, co-workers, etc. Further, the user can set the rules and/or parameters that control notifications to also be based on the subset of the other user who moved. For example, the user may set a rule to receive people/place notifications as to business contacts and co-workers at certain times (e.g., during business hours), or as to family and friends at other times (e.g., evenings and weekends).

In another alternative, the system can use default rules and/or observation of user behavior to infer the user's situation and preferences.

In a further alternative, the user can define various modes consisting of a set of rules and/or parameters controlling the place-specific buddy list service, and set their mobile device to apply a selected one of the modes. For example, the user might define a social mode where notifications as to anyone on their buddy list within a larger proximity are received and the user is visible to others; a business mode in which only notifications of their business contacts and co-workers in the same building are received and the user is visible to only their business contacts and co-workers, and a private mode in which the user is visible to only a select subset of other users.

In still a further alternative, the information service can measure the location of users and their proximity based on geographical coordinates, such as may be provided by a global positioning system. Alternatively, the information service can measure location and proximity based on a place naming schema or place names registry, which may be hierarchical. This place naming registry preferably is authoritatively managed by a registry provider.

In yet a further alternative, the information service can apply default rules and/or parameters as to state change events, notifications and alerts based upon the user's location or other place-specific context. For example, default rules can be applied in a movie theatre, conference room, etc. to disallow notifications via audible alarms; or on an airplane to disallow radio transmission of the state change events, notification or alerts to the user's device during take-off and landing procedures.

In another alternative, the information service can be operated and provided by an entity as part of a business venture, which may generate revenue from such operation based on usage fees, subscription fees, advertising fees such as for delivery of commercial promotions along with the information service notifications and alerts, or promoting auxiliary services that generate revenue along with the information service operation.

Additional features and advantages will be made apparent from the following detailed description of the illustrated embodiment which proceeds with reference to the accompanying drawings.

DETAILED DESCRIPTION

In the following detailed description, one implementation of a user-contextual information service based on place and people via mobile telecommunications devices according to the invention is embodied in a place-specific buddy-list information service. The place-specific buddy list information service supports searches based on people and place, and provides notifications or alerts also based on people and place. For example, the place-specific buddy list service provides notifications and alerts to a user that other users enumerated in the user's buddy list are within a given or selected proximity to the user, so that a spontaneous in-person meeting or like social interaction can then be arranged.

Figure 1:
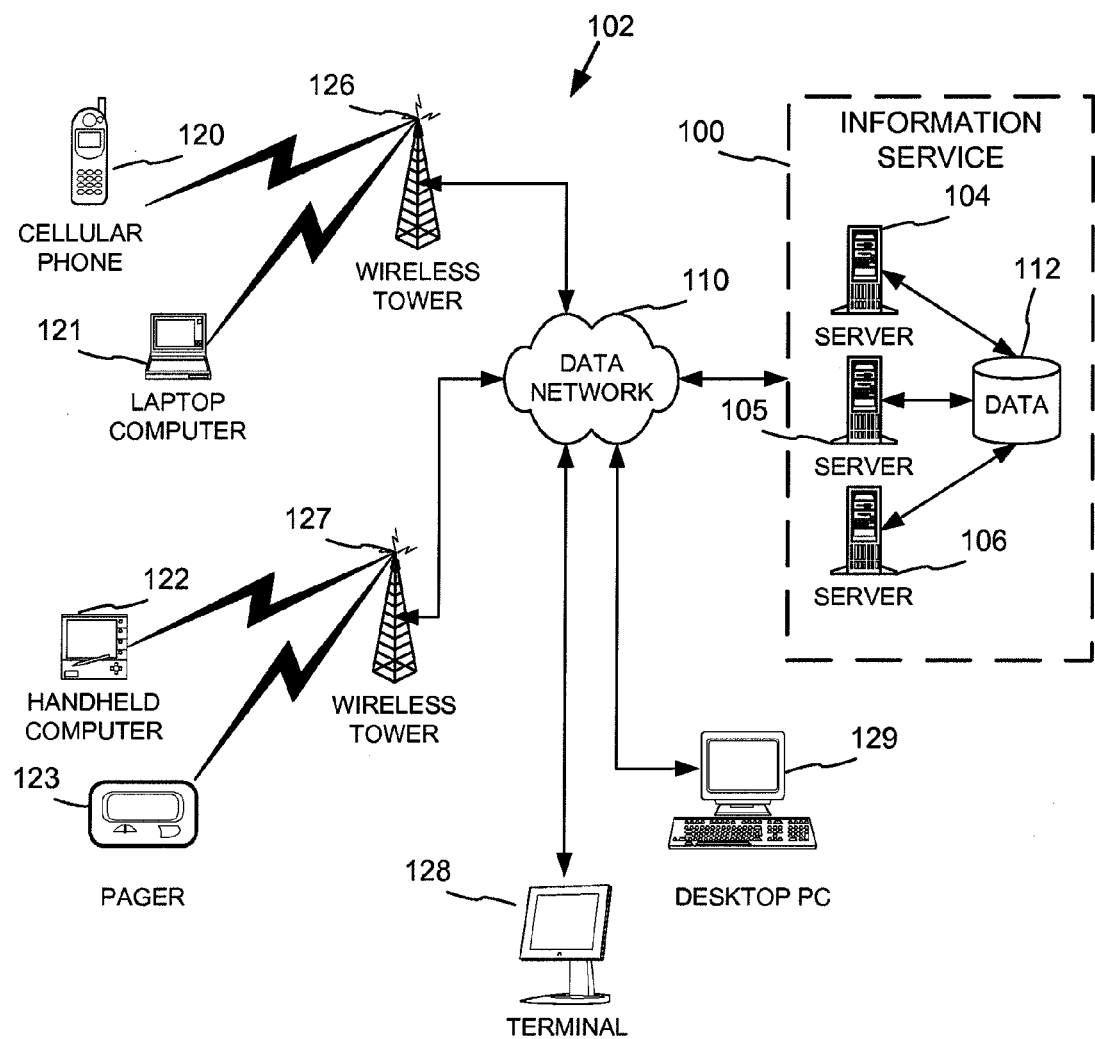
FIG. 1 is a block diagram depicting a communications system in which a place-specific buddy-list information service according to one embodiment of the invention operates.

With reference to FIG. 1, the place-specific buddy list information service 100 in an operating environment 102 of an illustrated embodiment of the invention is implemented in server application software run on a server computer or group of servers 104-106 connected on a distributed data communications network 110. The information service 100 tracks users of the information service and their locations in a people/place database 112. The information service 100 also may track locations of other place-specific resources (e.g., other data services, controllable devices, merchants offering particular products in a certain venue, etc.) on the data communications network, so as to provide auxiliary information as to these other place-specific resources along with the place-specific buddy list information. Some of this information may be obtained from third parties.

Users of the information service 100 access the information service from mobile personal networked computing or telecommunications devices 120-123, such as cell phones, personal digital assistants, handheld and laptop computers, electronic book or tablets, smart cards, electronic badges, and etc. Preferably, these mobile devices communicate with the information service on the data communications network 110 through a wireless networking and communications system (e.g., including wireless transmission/reception towers 126-127). The mobile devices 120-123 and information service can use standard data networking protocols for data communications on the network 110, such as TCP/IP, HTML, XML, HTTP, DNS, LDAP, and/or others. Alternatively, the data communications network also can encompass data communications technologies that may not provide constant or mobile wireless connections. In one alternative, the data communications network can use a short-range wireless technology, such as Bluetooth (which provides a point-to-point connection), for communicating the information service notifications (for example, to discover others on the user's buddy list in a large conference room). In another alternative, the user may intermittently connect on the data communications network and information service, such as use of a smart-card on a web kiosk 129 to access and receive notifications from the information service, where the user would only be connected and networked with the information service for the duration of the user's session at the kiosk.

The personal mobile data communications devices 120-123 and/or the data communications network 110 also are equipped with location detecting capability to determine the locations of the individual personal mobile devices, so as to thereby infer the position of their users. This location detection capability can be provided by equipping the individual personal mobile data communications devices 120-123 with a Global Positioning System (GPS) receiver, which detects the personal mobile communications device's location based on signals transmitted from GPS transmitters. Alternatively or additionally, the data communications network 110 can include equipment to determine the personal mobile data communications devices' locations by performing a triangulation process (or like location determination) based on the strength of the data communications or other signal transmitted from the personal data communications devices and received at nearby wireless towers 126-127. Alternatively or additionally, the user may provide location information by direct input, for example by entering (by speech, text, or bar-code or other machine readable data scanning) an intersection or venue name or other location-identifying information.

The locations of the personal mobile data communications devices 120-123 are reported to or polled by the information service 100, which uses this information to track the location of the devices' users in the people/place database 112. The personal mobile data communications devices' locations can be reported to the information service at periodic intervals, or alternatively may be reported whenever the location changes by a significant threshold amount. The interval and/or threshold amount are parameters that may vary depending on the design criteria of the application, or system. Alternatively, the locations can be reported to the information service in response to polling by the information service.

The information service 100 processes the information as to the users and their locations stored in the people/place database 112 so as to respond to search queries and provide alerts or notifications of changes. The users preferably can submit search queries and/or subscribe to alerts/notifications from their personal mobile data communications devices 120-123. Alternatively and/or additionally, the users may submit search queries and subscriptions from other computing and/or telecommunications devices connecting to the data communications network 110, which may include personal computers, telephones, and like stationary devices as well as mobile devices. For example, a user can submit a request using a personal computer to receive notifications on their mobile device (such as a pager) that users on his or her buddy list are nearby.

Figure 2:
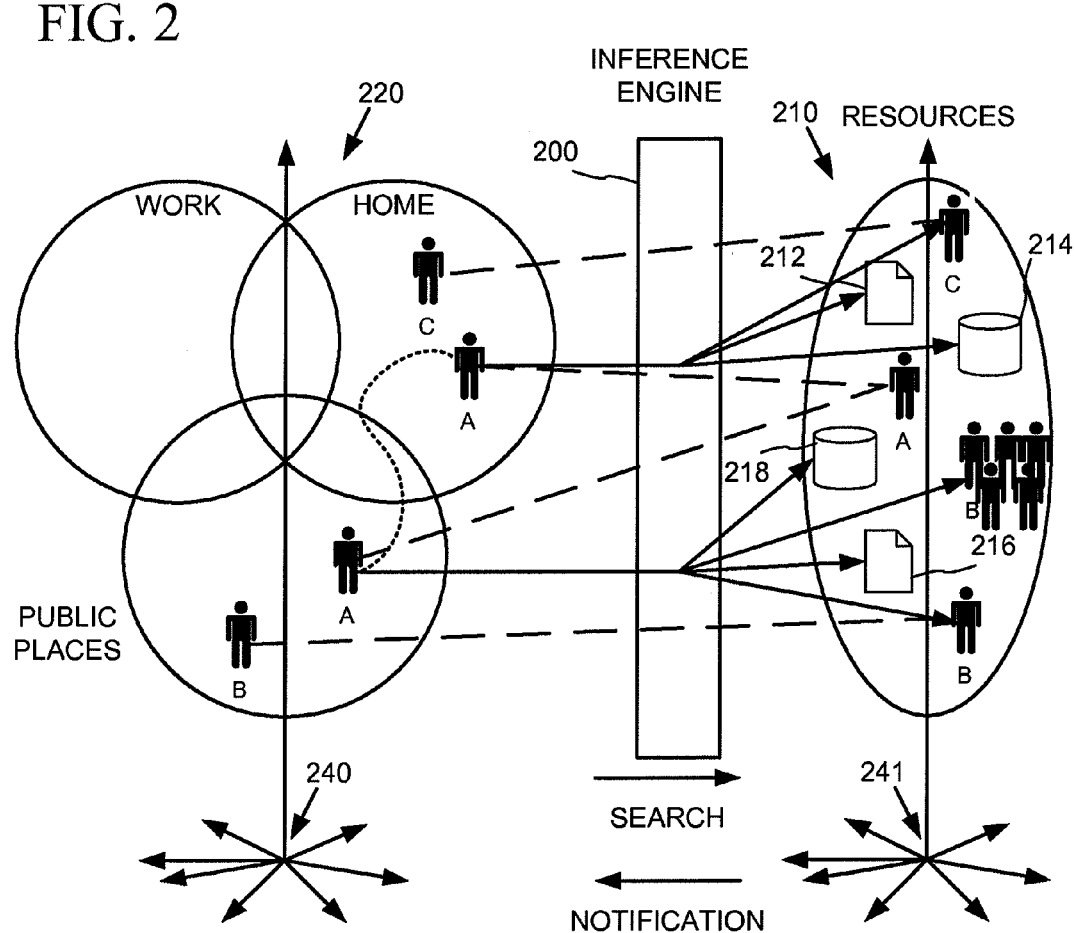
FIG. 2 is a conceptual block diagram of search and notification operations provided by the place-specific buddy-list information service of FIG. 1.

With reference now to FIG. 2, the information service 100 is implemented using an inference engine 200. The inference engine 200 is realized in software running on the server computers 104-106 (FIG. 1), and utilizing the people/place information in the database 112 (FIG. 1). The inference engine 200 operates to infer which resources 210 (i.e., principally people, both individuals and groups, but also locale-specific data, services, devices, and etc.) tracked by the service may be of interest to a user given that user's "place context" 220 (i.e., the user's location, but also optionally including other place-specific information such as whether the place is the user's home or place of work, etc.). The inference engine 200 processes information from the people/place database 112 to produce these inferences for both user-initiated searches and notifications triggered by events other than user requests (e.g., change in location of the user or of people on the user's buddy list). The resulting inferences are then conveyed to the user, preferably to a client software application on the personal mobile data communications device of the user.

As shown in FIG. 2 for example, the three users A, B and C are considered to be part of the resources 210 tracked by the inference engine 200 for drawing inferences. Each of these users A-C also has a place context 220. The place context is a set of attributes based on a user's location; along with information of the user's location, the attributes may include user persona/task/preferences/etc., applicable social circle, available devices, networks and services and so on. A particular user may have more than one concurrent place context, e.g. as a parent with children in a mall and as an employee working on a particular project in a city in a particular sales region. Based on the place context of a user who is the subject of a search or notification, the inference engine operates to determine or identify other resources that are nearby according to a proximity measure. When the user A is at home for example, the inference engine determines that the user C who also at home with user A is nearby, and identifies the user C as a nearby resource in response to the search query or in a notification to the user A. The inference engine may also identify other resources relevant to the user in the particular place context, such as a place-specific data file 212 (which may be a text, audio, image or video, such as of a message left for the user upon arrival at the place), service, device, database 214, etc. As the user A then moves location into public places, his or her place context changes, such that the inference engine infers other resources are nearby (e.g., user B, data file 216, and database 218). The inference engine then returns the inferred resources as results to a search query or in notifications.

The users' place contexts and the resources preferably are identified to the information service 100 and its inference engine 200 by a set of values or attributes. These attributes include at least the identity of the user (or resource), and of the user's (or resource's) location. Additionally, other attributes relating to place and the user/resource can be included, such as to identify group(s) of people (e.g., a buddy list), relationship (e.g., family, friend, co-worker, client, etc.), an activity or event that takes place at the location or in which the person participates, purpose or role that the place serves for the person (e.g., home, work or public place), and etc. These attributes conceptually define a point or range of points in a multi-dimensional space 240, 241 that the inference engine can use to measure proximity of the resources (including individuals and groups) to a user's current place context, such as by distance in the conceptual space 240, 241. (The dimensional space of the user and of the resources is, in effect, a single space, where the user's context is a resource to another user.) Because the multi-dimensional space 240, 241 includes dimensions other than just physical space, this measurement of proximity in terms of distance in the conceptual multi-dimensional space is based also on the other attributes of the resources and user place context in addition to geographical location. In one embodiment, this set of attributes can be a set of names from a multi-dimensional authoritative names registry, such as described more fully below.

Figure 3:
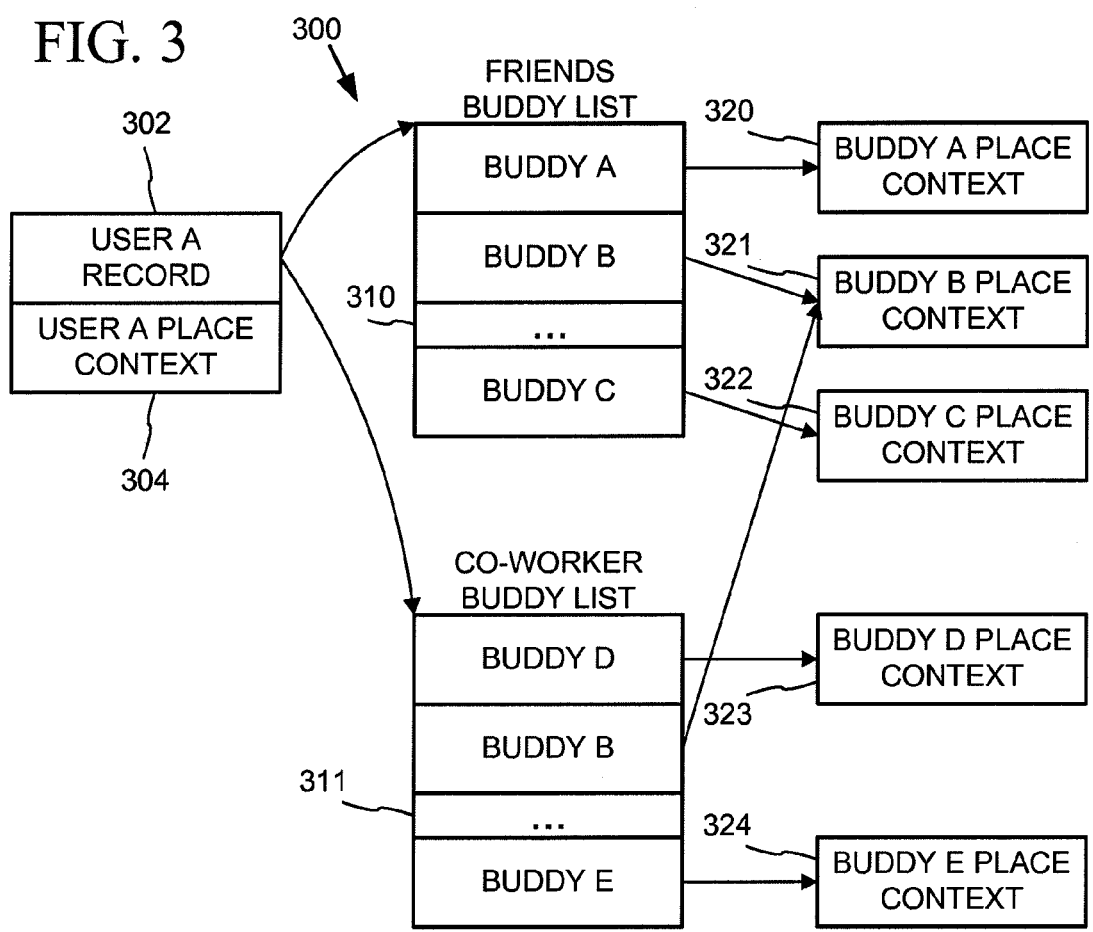
FIG. 3 is a block diagram depicting a data structure for representing a people and place state within the place-specific buddy-list information service of FIG. 1.

With reference now to FIG. 3, the information service 100 (FIG. 1) maintains data in the database 112 (FIG. 1) for drawing the proximity inferences depicted in FIG. 2. In a preferred embodiment, this data takes the form of a per-user, people/place state 300. The people-place state 300 includes a set of database records maintained for a user of the information service 100. This data set includes a user record 302, one or more buddy lists 310, 311, and place context records 320-324 of listed individuals (or groups).

The user record 302 stores data representing a user of the information service 100, such as the user A of FIG. 2, about whom the inference engine will draw place and people-specific inferences for searches and notifications. The user record 302 includes place context data 304 for the user, and links to any buddy lists 310-311 that have been defined for the user. As described above, the information service 100 updates the user's place context data when new location information is reported for the user based on position sensing equipment in the user's personal mobile data communications device, or in the communications network.

The buddy lists 310, 311 enumerate a set of people (e.g., other users) about whom the user desires to be informed by the information service 100. The buddy lists preferably are created via a process involving an exchange of text messages between the user and each person on the buddy list, in which the people consent to the information service providing their place-specific information to the user. Preferably, the user can organize people into multiple groups (e.g., with multiple buddy lists, or alternatively by adding a classification attribute to each person), such as lists of friends, co-workers, family, clients/customers, etc.

The people/place state 300 further includes place context data 320-324 for the people on the user's buddy lists 310, 311. The people's place context data indicates their location, and possibly other place-related attributes (e.g., type of locale, such as work, public place, airplane, which may allow for further place-specific processing for notifications and searches by the information service). Again, the information service 100 updates the people's place context data whenever changes are reported, such as from positioning equipment on the people's personal mobile data communications devices or the communication network.

Preferably, the information service implements the described people/place state 300 using distributing computing with a publish/subscribe eventing model. For example, a presence server for the user's "buddy C" receives location updates from the buddy C's mobile device or other location tracking method, and provides the buddy C place context data 322. The computer that maintains the people/place state 300 of the user A (which may be resident on another server of the information service 100, or on the user A's personal mobile data communications device or other client computer) subscribes to receive notifications of this buddy C place context data 322 from the buddy C's presence server. When a change to the buddy C's location or other presence information (e.g., availability) occurs, the buddy C presence server sends a notification to all that have subscribed, including to the user A. This then updates the buddy C place context 322 in the user A people/place state 300, which may result in alerts being presented to the user A.

Figure 4:
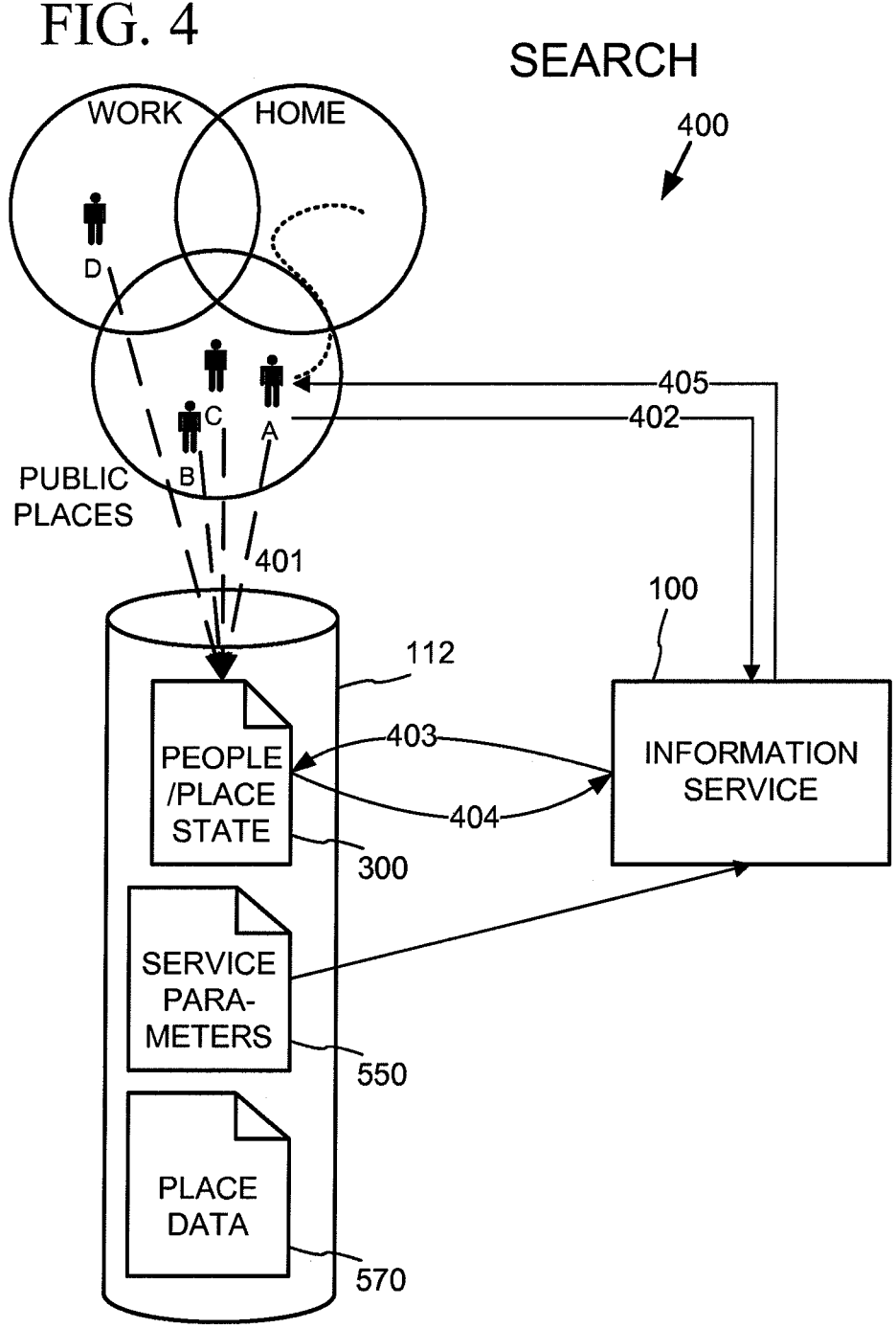
FIG. 4 is a data flow diagram of a search operation of the place-specific buddy-list information service of FIG. 1.

With reference to FIG. 4, the information service 100 provides a user-initiated search operation 400. In the search operation 400, the locations of the user (e.g., person A) and those on the user's buddy list(s) (e.g., people B, C and D) are first tracked (as indicated at 401) in the people/place state data 300 in the database 112 of the information service. When desired, the user can then submit (at 402) a search query to the information service 100, such as by entering a query or activating an application software feature that uses the search query on the user's personal mobile data communications device. The submitted query can include parameters to control the query scope, such as which people (e.g., friends or co-workers) to include in the search, the proximity threshold, etc. Upon the user initiating the search operation via the query submission, the information service 100 processes the people/place state data 300 at 403, 404 to determine which of the people B-D on the user's buddy list(s) are within a selected proximity of the user (e.g., people B and C in FIG. 4). The information service 100 at 405 finally returns results of the search operation to the user.

Figure 5:
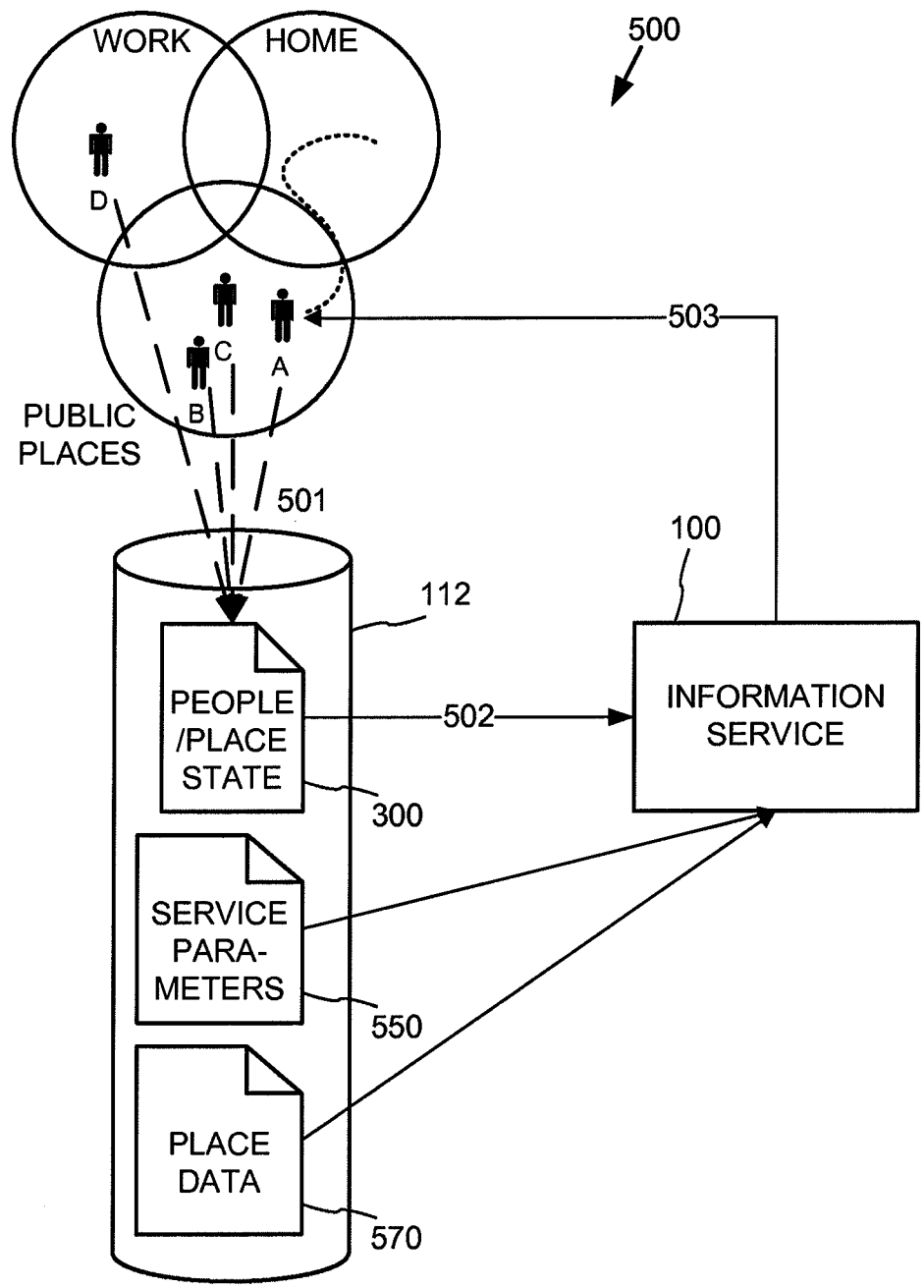
FIG. 5 is a data flow diagram of a notification operation of the place-specific buddy-list information service of FIG. 1.

With reference now to FIG. 5, the information service 100 also supports notification operations 500. In a notification operation, the locations of the user and those on the user's buddy list(s) again are tracked in the people/place state data 300 associated with that user in the database 112. Upon an update to the people/place state data 300 in which the relative locations of the user and/or those on the user's buddy list(s) change, the information service 100 determines which people are in the user's proximity based on the notification parameters at 502, and then formulates and transmits a notification message to the user at 503 (i.e., to the user's personal mobile data communications device for appropriate presentation to the user).

With reference again to FIGS. 4 and 5, the information service 100 preferably supports a variety of service parameters 550 to control the people and place-based information provided by the information service in searches and notifications. These parameters can be designated explicitly by the user, or alternatively provided implicitly. For example, one or more parameters can be implicitly set based on the activity in which the user is currently engaged as specified in the user's electronic calendar, so that notifications can be provided on different bases for a business meeting as opposed to a church or club social. As another example, default parameters can be provided for different locations, such that notifications are provided on a different basis in a movie theatre, than in a shopping mall or library. Further, the system can infer default parameters for the notifications based on observation of user behavior, which system inferences can be implemented as described by E. Horvitz, A. Jacobs, D. Hovel, *Attention-Sensitive Alerting*, Proceedings of UAI '99, Conference on Uncertainty and Artificial Intelligence, July 1999, pp. 305-313. The parameter settings for a user can be stored by the information service 100 in the database 112, or alternatively can be stored in a "cookie" or like client-side storage in the user's personal mobile data communications device or can be stored as settings for a client software application (such as may provide a graphical user interface to the user for accessing the information service from a client device).

One such parameter sets a proximity threshold within which people (or other resources 210 of FIG. 2) are to be considered proximate to the user by the information service for purposes of responding to a search or providing notifications. This proximity parameter can have the form of a geographic distance threshold, e.g., a radius in miles or kilometers, within which the people or resources must be located to be considered in proximity to the user. In alternative embodiments of the information service, the information service can employ a database or databases of detailed place information (e.g., place data 570), so as to allow proximity parameters, such as same city/town/neighborhood, same venue, same building, same room, and the like. With such alternative proximity parameters, the information service 100 considers the people or resources to be in the user's proximity if the place database information indicates their locations are within the scope indicated by the parameter.

Preferably, the information service supports that different people have different proximity thresholds. This applies both the degree to which a user discloses their location to others, and the relevance of another's location relative to the user. In the first case, a user may provide very accurate information to trusted individuals (e.g. location to 10 meter resolution to family members) and less accurate data to others (e.g. simply the city where one is located to a co-worker). In the second case, a user may only be interested in notification of the location of a person they see frequently if that person within a block or so, whereas they may wish to be notified if a close friend who lives in another country happens to be in the same city as the one they currently find themselves in.

The information service preferably also supports visibility parameters, which control when a person's location is available to be included in search response or notifications. The person would set the visibility parameters to be either visible or not visible to a particular user or group of users. For example, the person B in FIGS. 4 and 5 could select to be not visible to the user (person A) even though they would be sufficiently nearby for the person B to otherwise be included in the user's search responses or notifications. Further, by setting the visibility parameter for different groups of people, the person could elect to have the information service inform some groups of his or her contacts about his or her proximity, while not informing others (e.g., visible to co-workers and clients, but not visible to friends).

The information service further supports a parameter for the user to disable and enable notifications from the information service 100. In FIG. 5 for example, the user could set this parameter to disable notifications when at work, and later set the parameter to re-enable the notifications when in a public place. Further, the information service preferably supports notification enablement parameters for groups of people, so as to allow the user to enable notifications for one group of people on his or her buddy list while disabling notifications as to another group (e.g., enabling notifications as to friends, while disabling co-worker and client notifications). In the notification 500 illustrated in FIG. 5 for example, the user A could enable notifications from a group including person B, while disabling notifications from another group including person C, such that the information service in this instance only informs the user A of person B's proximity.

Further, the information service 100 (FIG. 1) preferably also supports system-defined or user-defined modes, in which a combination of the above-described parameter settings are effective. For example, the user could define an "at work" mode, where the user is visible to and enables notifications about co-workers and clients within a narrow proximity threshold, but is not visible to and disables notifications about the user's friends. As another example, the user could define a "social" mode, where the user is visible to and enables notification about all persons on the user's buddy list(s) within a broader proximity threshold. The user can then change easily between various combinations of parameter settings by selecting among the defined modes. These modes also can be stored for the information service as the service parameters 550 in the database 112, or in client-side storage.

Additionally, the information service 100 (FIG. 1) preferably supports scheduling of the parameter settings 550 by a user, where the user can designate when (e.g., times of the day or week) parameter settings are to be effective. For example, the user A could designate that the "at work" mode is to be effective during work hours Monday through Friday, whereas the "social" mode is to be effective on evenings and weekends.

With reference still to FIGS. 4 and 5, the information service 100 also supports place-dependent parameter settings 560. Depending upon the user's location, the information service may impose particular place-specific notification and search parameter settings. For example, the place-specific parameter settings for a movie theatre or library could prohibit users' personal mobile data communications devices from giving audible alerts of notifications (e.g., only vibration, visual or other silent alert), and altogether disallowing notifications and searches when the user is on an airplane. Large venues such as a public park or stadium may provide a wide proximity threshold setting as by default, whereas a smaller default proximity threshold may be imposed for small venues (e.g., inside a restaurant). Venues that apply entry control (e.g. a ballpark) may require the service to apply a hierarchical filter on proximity, i.e. a friend that is physically close but outside the ballpark may not qualify as being sufficiently close for the purposes of meeting since they cannot rendezvous. This place-specific parameter settings can be stored by the information service with the place data 570 in the database 112. Alternatively, the place-specific parameter settings can be accessed from a server computer specific to the place, such as may be provided by a property owner or like.

The place-specific buddy list service 100 of FIG. 1 can be applied to a variety of different usage scenarios. In one use scenario, the information service facilitates spontaneous in-person meeting and social interaction. While the user goes about their normal activities, such as running errands or shopping, the information service provides notifications to the user when people on the user's buddy list come within a proximity scope of the user. The user can then contact the person, such as via cell phone, pager, other electronic messaging, or even orally to arrange for an immediate rendezvous. The information service thus provides the electronic equivalent of the fictitious "sixth sense," by informing the user when their friends, associates or other contacts are just-around-the-corner. In some use scenarios, the search results and notifications with information that people enumerated on a user's buddy list are located in proximity to the user can be provided to a permitted third party or agent.

In a further use scenario, the information service 100 can be used to locate people. For example, a parent can initiate a search with the information service to assure that his or her child remains nearby. Alternatively, the information service can provide information in addition to proximity or non-proximity, such as actually detailing the location of a person or persons on the user's buddy list. In an example use of this alternative service, the parent also can locate the child who is "out with friends" via the search on the information service.

In another use scenario, the information service provides notifications to a user at a desktop machine 129 (or their personal mobile data communications device or etc.) if a sufficient number of friends are clustered in a particular place.

For example, a user may decide to leave work and go to a basketball court if and when more than four of her friends have arrived there.

The information service 100 also has application to facilitating "commuter group talk." In this use scenario, the information service tracks a group of people who habitually travel in geographical proximity as a place-specific buddy list. For example, this group can be commuters who share a same commute path (e.g., are stuck in a same traffic jam every work day morning), or retirees that migrate year-to-year to a same sun-belt get-away for the winter months. The information service provides notifications when people in such a group are geographically proximate, so that the users can then join in group talk or chat communications, such as via a cell phone "party line" or "tele-conferencing," via radio, other multi-party mobile voice communications, text messaging or other multi-party communications. The group can have a pre-arranged teleconference that can be joined upon receiving notification from the information service that others in the group are nearby. Alternatively, the information service can provide a link to a multi-party communications session (e.g., a teleconference phone number, radio channel, Internet URL, or like) that can be used by the recipient to join in the group talk. In some embodiments, a talk mediator or host (such as may be employed by the provider of the information service, or carrier of the cell phone or radio-based teleconferencing session) leads discussion among the participants in the commuter group talk. The cell phone or radio-based teleconferencing carrier or provider thus may sponsor commuter group talk facilitated by the information service so as to promote usage of the provider's communications network.

The above-described information service can be operated as a business under various revenue plans. This includes as a subscription or usage-based service, in which the user pays for use of the service. Alternatively or in addition, the information service may derive advertising revenue, such as for providing advertising messages or promotions in combination with the search responses and notifications. For example, the information service can announce a nearby advertiser (such as a restaurant, coffee shop or book store) in combination with a notification that a person on the user's buddy list is nearby, and may also provide a coupon or other promotion by the advertiser. These advertisements can be targeted according to a user profile or user-specified preferences, so as to advertise a nearby vegetarian restaurant to a vegetarian user or a coffee shop to a coffee drinker. Also, the information service can be operated as a platform enhancement (typically free to the user) that adds value to a "platform" product or service that is purchased by the user, such as a hardware product (e.g., the user's personal mobile data communications device 120-123 of FIG. 1), software (e.g., operating or application software for the user's personal mobile data communications device), data communications service (e.g., for cell phone, Internet or other communications service on the data communications network 110 of FIG. 1 or other related communications network), or media or content source (e.g., an Internet "portal" site). In addition, information from the information service can be consumed by other information services to enhance information provided to such other information services' users, such as under a revenue sharing arrangement, license fee, or other arrangements. Also, the information service operator can charge a fee to third party service providers for being listed in a particular venue.

Operating Environment

FIG. 1 illustrates an example of a suitable operating environment 102 in which the invention may be implemented. The operating environment is only one example of a suitable operating environment and is not intended to suggest any limitation as to the scope of use or functionality of the invention. As described above, the illustrated operating environment comprises server computers 104-106, data communications network 110, database 112, and mobile data communications devices 120-123. A variety of other well known computing systems, devices, environments, and/or configurations also are suitable for use with the invention, which include personal computers, handheld computers, laptop computers, handheld or palmtop computers, wearable computing devices, electronic books, tablets, smart cards, devices or products with embedded computing capability, broadcast media receivers and other consumer electronics products, network computers or terminals, server computers, minicomputers, mainframe computers, distributed computing environments that include any of the above systems or devices, wireless local area networks, cell phone networks, pager networks, radio and television communication networks, cable networks, satellite communications networks, broadband data communications networks, the Internet, and like others.

The invention has been described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Figure 6:
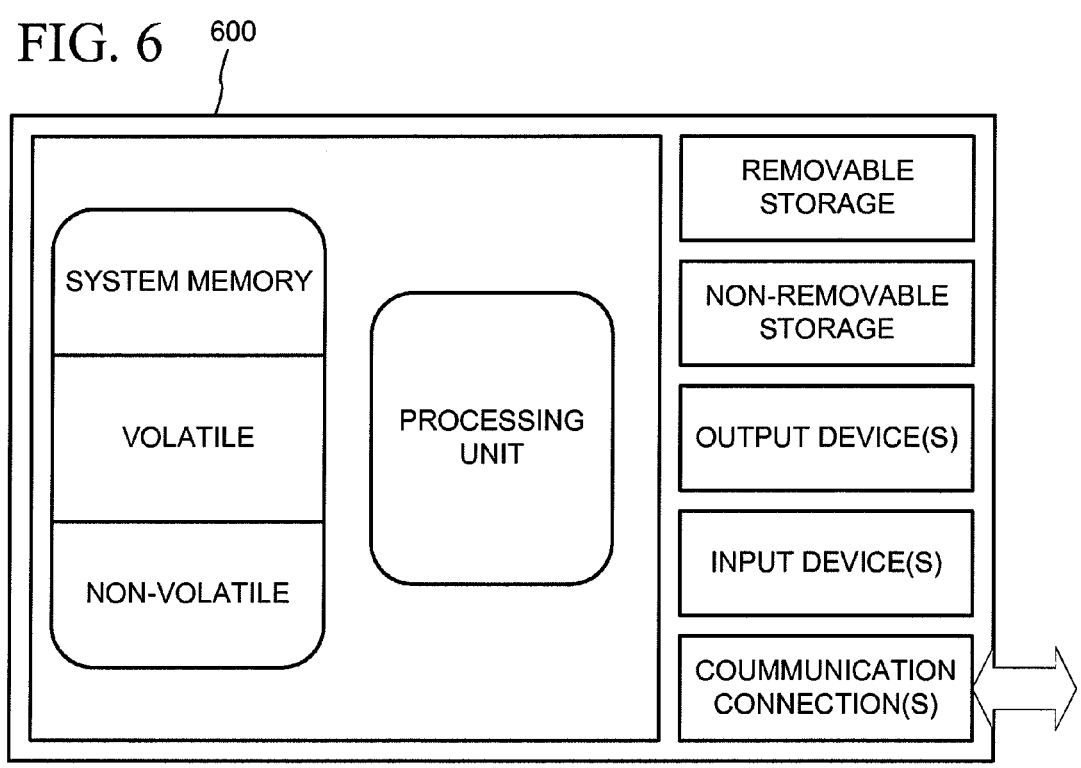
FIG. 6 is a block diagram of a basic configuration of a computer may be used to run the information service of FIG. 1.

With reference to FIG. 6, an exemplary computer 600 in the operating environment 102 (such as used for the servers 104-106 or mobile devices 120-123) typically is configured to include a processing unit 602 (e.g., a microprocessor or micro-controller) and system memory 604. Depending on the exact configuration and type of computing device, the system memory may be volatile (such as RAM), non-volatile (such as ROM, flash memory, etc.) or some combination of the two. Additionally, the computer 600 may also have mass or secondary storage (removable 606 and/or non-removable 607) such as magnetic or optical disks or tape. Similarly, the computer 600 may also have input devices 610 such as a keyboard, pointing device, microphone, etc., and/or output devices 612 such as display, speaker, printer, force-feedback, etc. The computer 600 also typically includes network connections to other devices, computers, networks, servers, etc. using either wired or wireless media. Alternatively, the system components of a computer may in fact be embodied in a distributed computing system. For example, a terminal device may incorporate input and output devices to present only the user interface, whereas processing component of the system are resident elsewhere. A phone may present web pages that are constructed on a remote server from data resident on a database server somewhere else again.

The various computers (including embedded computing devices) in the operating environment 102 (FIG. 1) typically include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Authoritative Multi-Dimensional Names Registry

Figure 7:
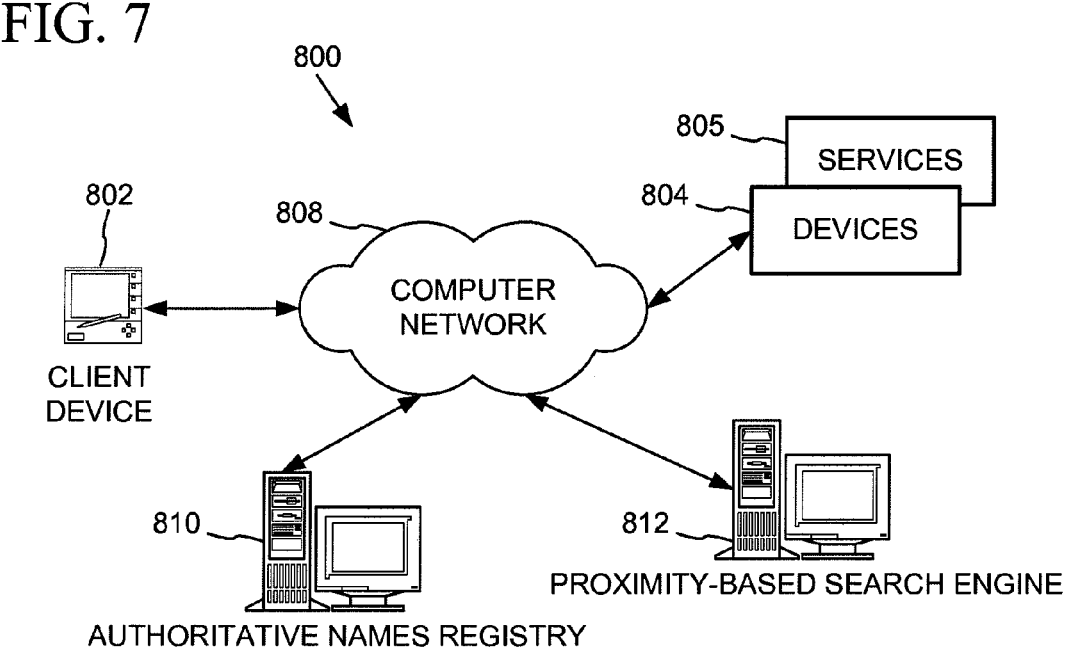
FIG. 7 is a diagram of computers that provide an authoritative names registry and proximity-based search engine for use in the place-specific buddy-list information service of FIG. 1.

With reference now to FIG. 7, the illustrated implementation of the invention has an authoritative names registry 810 and a proximity-based search engine 812 that provide a proximity measure for use by the information service 100 (FIG. 1) within an operating environment 800 that includes a client device 802 and a variety of devices 804 and services 805 accessible to the client device 802 via a computer network 808 (e.g., the Internet and its associated computer networks, or other computer network with large number of interconnected computing devices). The devices 804 and services 805 can include embedded computing devices and their services, interconnected via the network 808. The services 805 also can include any variety of services that can be made available over the computer network, including services to provide access to information, on-line shopping, communications, entertainment and etc.

The authoritative names registry 810 and the proximity-based search engine 812 also reside on computers that are connected to the computer network 808. Although illustrated in FIG. 7 as residing on a single computer each, the authoritative names registry 810 and proximity-based search engine preferably are each deployed over a server cluster, group of mirrored server computers, or otherwise distributed over a group of computers in order to service a heavy load of service requests from large numbers of users.

The authoritative names registry 810 contains a database that represents a registry of names, which is used to define proximity of the devices 804 and services 805 to the client device 802 and its user. This database can further represent a mapping of individual of the names to an address (e.g., an IP address), that can be used to access a resource over the computer network. This resource preferably is a data or executable file, such as an XML format file (possibly with associated XSL style sheet), a COM object, an HTML format file, a Java applet, or like resource, that describes and/or interacts with an item denoted by the name. In other words, the structured data or executable code defines a protocol for interaction with the device and activation of the device's operational functions. However, the names of the registry 810 need not map to a resource in all cases. Access to the device protocol can be controlled using cryptographic security, such as well-known access control techniques based on private/public key cryptography (e.g., RSA, PGP or like cryptography).

The authoritative names registry 810 also implements a name look-up service. Given a name, this name look-up service determines whether the name is indeed registered in the authoritative names registry 810, and resolves the name to its mapped address on the computer network 808 (if mapped to an address). Preferably, the name look-up service conforms to the Internet standard domain name service (DNS) for look-up of an Internet domain name. A client name look-up request is made using the UDP or TCP protocol to a names registry server. The names registry servers of the authoritative names registry 810 generally are organized in a hierarchy to maintain separate portions of the names in the authoritative names registry. The client's name look-up request can be passed upwards within this hierarchy until reaching the names registry server pertinent to the name look-up request. [For more information on DNS, see C. Partridge, *Mail Routing And the Domain System*, IETF, RFC 974 (January 1986)].

Figure 8:
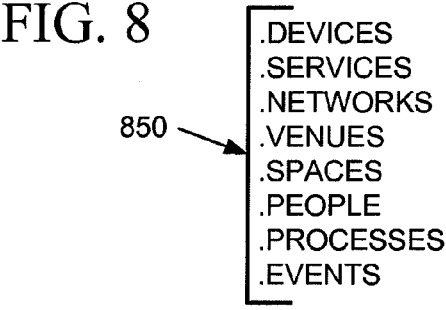
FIG. 8 is a listing of dimensions in the authoritative names registry of FIG. 7.

With reference now to FIG. 8, the authoritative names registry 810 has a number of dimensions 850 in which names are organized. These dimensions include devices, services, networks, venues, spaces, people, processes, and events. The organization of names within these dimensions establishes a taxonomy or categorization of items denoted by the names, so as to represent relationships between items according to these dimensions. More specifically, these dimensions conceptually form a multiple dimensional proximity space, which can be used to measure and assess proximity of the devices 804 and services 805 in a search. Each of the names dimensions forms a conceptual axis in this multiple dimensional space. Thus, each of devices, services, networks, venues, spaces, people, processes, and events is an axis of the conceptual proximity space. A set of related names from each of the dimensions designates a point in the conceptual proximity space. With two such sets of names, a proximity distance can be calculated in the conceptual proximity space (e.g., as the square root of a sum of the squares of the differences between the sets in each dimension). In practice, a proximity distance can be calculated between sets that don't include a name in each dimension. The proximity distance in the multiple-dimensional, conceptual proximity space provides a measure of proximity for proximity networking operations in the illustrated implementation of the invention.

The particular names dimensions of the illustrated implementation are chosen to represent factors found to be highly relevant to measuring proximity of the devices 804 and services 805 in a pervasive networking, such as the people A-C and resources 212, 214, 218 of FIG. 2. These factors include factors closely related to geographical proximity, such as the venues and spaces dimensions. But, the chosen names dimensions also represent non-geographical factors such as relationships of devices, services, networks, people, processes and events. Further, even the venues and spaces represent more than simply geographical distance, but also relate to conceptual organizations of geographical space. For example, a room in a building and a sidewalk outside the building may be separated by only a few feet of geographical distance. However, the names denoting these locations in the spaces dimension of the authoritative names registry can be organized (such as by a hierarchical structuring of names in the spaces dimension) to reflect that the room is conceptually more related (proximate) to other rooms in the building than to the geographically nearby sidewalk outside.

More particularly, the names in the devices dimension of the authoritative names registry 810 denote devices with embedded computing capability that are accessible on the computer network, such as the embedded computing device 100 or the various devices described above in the computing environment 102 of FIG. 1. The names in the services dimension pertain to services that are available over the computer network 808, such as information services, on-line shopping and other commercial services, entertainment, and the like, as well as individual operations that may be performed by an embedded computing device that is connected to the computer network 808. The names in the networks dimension relate to networks (interconnected group or systems), such as computer networks, communications networks, distribution networks, transportation networks, etc., as well as their constituent parts. The names in the venues and spaces dimensions relate to geographical places or locations, and may also include virtual locations. Venues are locations that comprise aggregations of individual places, such as a sports arena, convention center, mall or the like. Spaces are individually identifiable places, that may or may not form part of a venue. The names of the people dimension relate to people and units that group people collectively, such as families, couples or other organizations. The names in the processes dimension relate to business or other organizational processes or protocols, such as orders, invoices, requests, notices and other forms or protocols with which business and other activities of the organization are conducted. The events dimension's names relate to occasions, happenings or activities in which people participate, such as meetings, conferences, sports games, theatrical presentations, concerts, and the like, which generally have an associated time and place of occurrence (such as may be denoted in the venues or spaces dimension). Although the dimensions are designated in the illustrated implementation with the terms, "devices, services, networks, venues, spaces, people, processes, and events," alternative implementations can designate these conceptual dimensions using other terms (e.g., the term "locations" or "places" instead of "spaces"). Alternative implementations also can include fewer or additional dimensions than those described for the illustrated registry.

Figure 9:
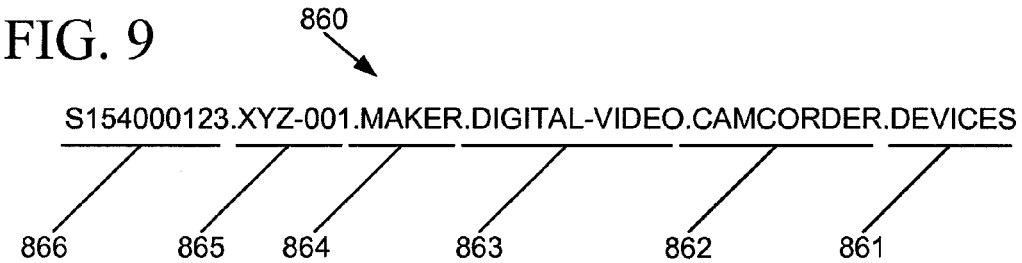
FIG. 9 is a listing of a name registered under a dimension of the authoritative names registry of FIG. 7.

With reference now to FIG. 9, an exemplary name 860 in the devices dimension consists of a sequence of words 861-866 separated by periods as delimiters. The words are organized right to left in order of increasing specificity. More particularly, the right-most word is the most general and denotes the devices dimension. Words progressing to the left reflect narrower sub-categories under the broad devices dimension. Many such sub-categories can exist under each dimension of the authoritative names registry 810 (FIG. 7).

Figure 10:
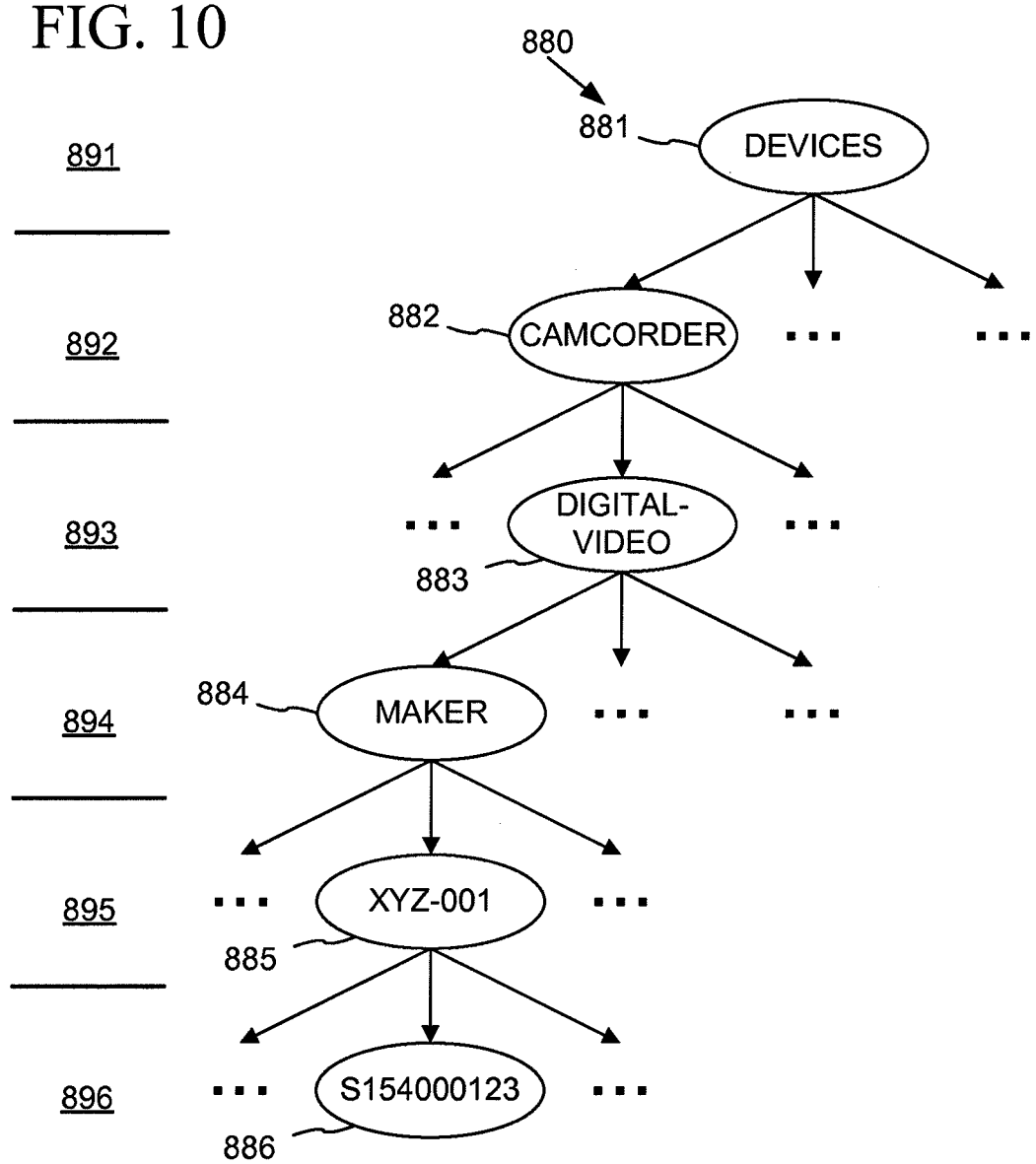
FIG. 10 is a diagram of a hierarchical organization of names in a dimension of the authoritative names registry of FIG. 7.

With reference to FIG. 10, the structure of words that form the exemplary name 860 (FIG. 9) reflect a hierarchical organization 880 of names within the device dimension. Each of the words 861-866 corresponds to a node 881-886 in this hierarchical organization 880. The hierarchical organization 880 groups these nodes in successive levels 891-896 which correspond to the successively more specific sub-categorization within the devices dimension. In the illustrated implementation, the initial level or levels of the devices dimension hierarchy define generic types of devices. For example, the names "camcorder" and "digital-video" at levels 892 and 893 designate generic types of an embedded computing device. Examples of additional generic device types that may be registered at the initial level 892 under the devices dimension include camera, speaker, set-top, VCR, coffee-maker, clock, telephone, and other generic device types of the many varieties of embedded computing devices in a pervasive computing environment, such as the environment 102 of FIG. 1. At levels beneath a generic device type name in the hierarchy 880, device specific-names can be registered, such as names of a particular make or manufacturer, model, sub-model, and even serial number or serial number range.

The names within the dimensions of the authoritative names registry 810 (FIG. 7) can be organized hierarchically as shown in FIGS. 9 and 10. Alternatively, the names in a dimension of the registry can have a non-hierarchical organization, e.g., simple flat list, directed graph, or others.

With reference again to FIG. 7, the proximity-based search engine 812 provides a search service, which uses the authoritative names registry 810 to assess proximity of the devices 804 and services 805 relative to the client device 802. The proximity-based search engine uses a set of names associated with the client device 802 as implicit search terms to qualify an explicit search query submitted from the client device 802, as well as to assess proximity of people and resources for the information service 100 of FIG. 1. These implicit search terms can include a name for the client device 802 within the devices dimension, a name of the client device's user in the people dimension, a name in the event dimension of an event at which the client device is used, a name in the venues and spaces dimensions of the client device's location, etc. As described above, such a set of names designates a point in the conceptual proximity space.

Figure 11:
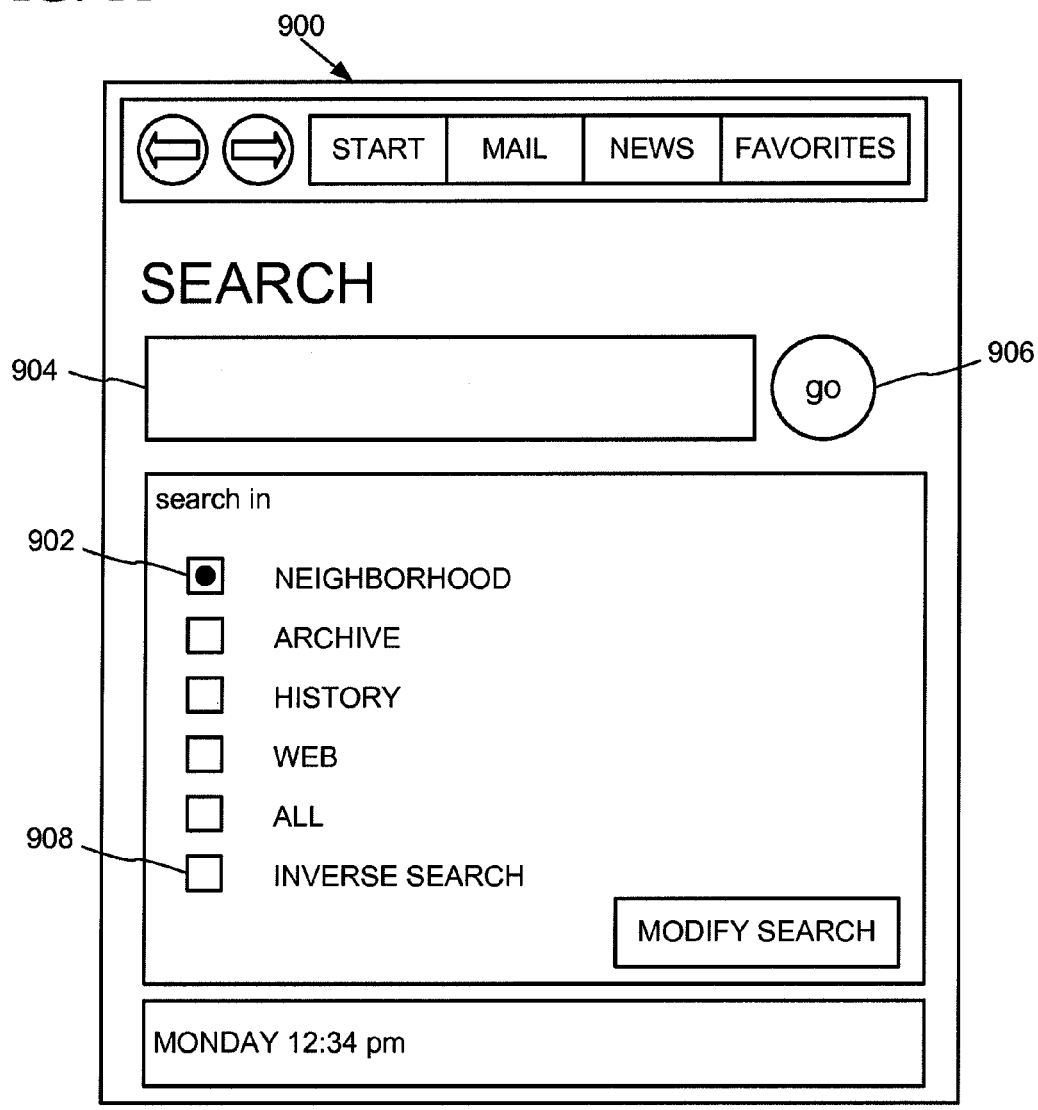
FIG. 11 is a view of a user interface screen display on the client device of FIG. 7, with which a user can initiate a proximity-based search.

FIG. 11 shows an exemplary user interface display on the client device 802 (FIG. 7) with which its user submits a search query to the proximity-based search engine 812. The user chooses a proximity-based search by selecting a radio button 902 marked "neighborhood." The user also enters explicit search terms in a text box 904, and then clicks on a button 906 labeled "go." This submits a search query that incorporates the text in the text box 904 as explicit search terms, which also is qualified by the set of names from the authoritative names registry 810 that are associated with the client device 802 (or use thereof).

With reference again to FIG. 7, the devices 804 and services 805 preferably each include an XML description file. The XML description file is a structured file having parts designated by tags. These tags are used to designate attributes of the device 804 or service 805 described. In the illustrated implementation, the attributes can include names in the authoritative names registry. The names designated in the XML description file of a device or service also form a set to designate a point in the conceptual proximity space represented by the authoritative names registry. The proximity-based search engine 812 calculates the relative distance of this point from the point designated by the client device's names set in the multiple dimensioned, conceptual proximity space to produce a measure of the proximity of the device or service from the client device 802.

The proximity-based search engine 812 uses the proximity measure to qualify the user's explicit search query. For the explicit search terms of the query, the proximity-based search engine 812 employs conventional search techniques, such as may be based on automated indexing of unique words encountered in the device or service's XML description file, or manual editor categorization of the devices 804 and services 805. The proximity-based search engine 812 can apply the proximity measure to pare down the results of the explicit search query, such as to exclude results not within a proximity threshold. Alternatively, the proximity-based search engine 812 can apply the proximity measure to order the results of the explicit search query by proximity, so that the most proximate results are presented at higher priority.

The set of names for the client device 802 also can be derived from an XML description file of the client device 802. This approach works well for attributes of the devices that tend to remain static, such as the name of the client device 802 itself. However, other attributes such as for the venues, spaces, events and even people can change. For these dimensions, the illustrated implementation can look up an XML description related to known names, such as using the name look-up service of the authoritative names registry. For example, the client device 802 may first determine the name in the authoritative name registry of the user from a user attribute in its own XML description file (which may change depending on who is logged onto the client device). The client device 802 then uses the user's name to retrieve an XML description file (or other information) of the user. This information for user may include a calendar that indicates an events dimension name, venues dimension name and spaces dimension name for an event that the user is scheduled to attend. The client device 802 can then include these names as implicit search terms when the user submits an explicit search query to the proximity-based search engine 812.

Additionally, the proximity-based search engine 812 supports a proximity-based inverse search. In the user interface 900 of FIG. 11, the user can designate such inverse search by selecting the radio button 908 labeled "inverse search." In the inverse search, the proximity-based search engine 812 monitors the proximity of the devices 804 and services 805 that meet the explicit search terms, and generates an alert or notification to the client device when any such devices come within the proximity of the client device. This can be used at a convention, for example, to receive an alert when a particular person (who is wearing a name badge embedded computing device) enters a particular meeting or convention center room.

Referring still to FIG. 7, the authoritative names registry 810 is managed by an authority, which is a trusted business or organization accountable to the users of the registry and search engine service. The authority performs the necessary function of resolving disputes in ownership of names in the authoritative names registry, and secures the authoritative names registry from unauthorized alteration, fraud or other possible attacks. The authority also administers registration of names in the various dimensions, and preferably operates the authoritative names registry to maintain essentially continuous operation. In the illustrated implementation, the authority administers at least registration of names at a first level below each dimension (e.g., the level 892 of FIG. 10). Names at levels under a registered first level name in the hierarchy can be administered, in turn, by the registered owner of the name, such as by providing an appropriate name look-up service.

The authority in the illustrated implementation manages the authoritative names registry 810 as a business process. In this business process, the authority charges recurring registration fees to register a name in a dimension of the authoritative names registry. The authority can charge such registration fees for one or more levels in a hierarchically organized dimension, and alternatively can subcontract administration of names below a given level of the dimension to registrants of the names on that level. Additionally, the authority charges usage fees for use of the name look-up service and the proximity-based search service. This usage fee generally is charged to the user of the client device 802 or of a service that employs the authoritative names registry for proximity assessment. Alternatively, the usage fee can be charged back to the registrant (at any level) of a name upon access for either the name look-up service or proximity-based search service for a user.

In particular with respect to the devices dimension of the names registry, the authority in the illustrated implementation provides generic device type names at initial levels (e.g., levels 892, 893) of the devices dimension in the authoritative names registry, which are not registered to nor charged registration fees to any registrant. However, the authority registers specific device type names at a level (e.g., level 894) that appear under a generic device type name to registrants (such as a device manufacturer), and charges recurring (e.g., on an annual or other periodic basis) registration fees to the registrants. The registrant owns the specific device type name, and provides the device-specific XML or COM object file on the computer network that is accessed with the name. The authority may also charge registration fees to the registrant for registering additional names at lower levels (e.g., 895-896) under such first device-specific name in the devices dimension hierarchy 880. Alternatively, the registrant owning a specific device type name can be permitted to register such lower level device specific names without further charge, and provide its own names registry services for such lower level device specific names.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A method for providing a location information service, the method comprising:
   receiving, from a first mobile computing device, one or more reports of a location of the first mobile computing device;
   determining, based at least in part, on the one or more reports of the location of the first mobile computing device, a list of one or more places near the location of the first mobile computing device;
   receiving a selection of one of the one or more places near the location of the first mobile computing device; and
   transmitting the selection of the one of the one or more places to a second mobile computing device.

2. The method of claim 1, further comprising:
   receiving at least one additional report of a location of the first mobile computing device when the first mobile computing device is no longer at the selected one of the one or more places; and
   updating the location of the first mobile computing device.

3. The method of claim 2, further comprising transmitting the updated location to the second mobile computing device.

4. The method of claim 1, wherein at least one of the one or more places comprises a role of the at least one of the one or more places.

5. The method of claim 4, wherein a role of the at least one or more places comprises one of work and home.

6. The method of claim 1, wherein a user of the first mobile computing device has an established relationship with a user of the second mobile computing device.

7. The method of claim 6, wherein the user of the second mobile computing device is a contact of the user of the first mobile computing device.

8. A computer-readable storage medium encoding computer executable instructions which, when executed by at least one processor, performs a method for providing a location information service, the method comprising:

receiving, from a first mobile computing device, one or more reports of a location of the first mobile computing device;

determining, based at least in part, on the one or more reports of the location of the first mobile computing device, a list of one or more places near the location of the first mobile computing device;

receiving a selection of one of the one or more places near the location of the first mobile computing device; and transmitting the selection of the one of the one or more places to a second mobile computing device.

9. The computer-readable storage medium of claim 8, further comprising instructions for:

receiving at least one additional report of a location of the first mobile computing device when the first mobile computing device is no longer at the selected one of the one or more places; and updating the location of the first mobile computing device.

10. The computer-readable storage medium of claim 9, further comprising instructions for transmitting the updated location to the second mobile computing device.

11. The computer-readable storage medium of claim 8, wherein at least one of the one or more places comprises a role of the at least one of the one or more places.

12. The computer-readable storage medium of claim 11, wherein a role of the at least one or more places comprises one of work and home.

13. The computer-readable storage medium of claim 8, wherein a user of the first mobile computing device has an established relationship with a user of the second mobile computing device.

14. The computer-readable storage medium of claim 13, wherein the user of the second mobile computing device is a contact of the user of the first mobile computing device.

15. A system comprising:
one or more processors; and
a memory coupled to the one or more processors, the memory for storing instructions which, when executed by the one or more processors, cause the one or more processors to perform a method for providing a location information service, the method comprising:

receiving, from a first mobile computing device, one or more reports of a location of the first mobile computing device;

determining, based at least in part, on the one or more reports of the location of the first mobile computing device, a list of one or more places near the location of the first mobile computing device;

receiving a selection of one of the one or more places near the location of the first mobile computing device; and transmitting the selection of the one of the one or more places to a second mobile computing device.

16. The system of claim 15, further comprising instructions for:

receiving at least one additional report of a location of the first mobile computing device when the first mobile computing device is no longer at the selected one of the one or more places; and updating the location of the first mobile computing device.

17. The system of claim 16, further comprising instructions for transmitting the updated location to the second mobile computing device.

18. The system of claim 15, wherein at least one of the one or more places comprises a role of the at least one of the one or more places.

19. The system of claim 15, wherein a role of the at least one or more places comprises one of work and home.

20. The system of claim 15, wherein a user of the first mobile computing device has an established relationship with a user of the second mobile computing device.

* * * * *